United States Patent
Ohl et al.

(10) Patent No.: US 7,827,377 B2
(45) Date of Patent: Nov. 2, 2010

(54) METHOD FOR READING OUT SENSOR DATA

(75) Inventors: Christian Ohl, Pfullingen (DE); Andreas Fink, Weiusberg (DE); Maike Moldenhauer, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 692 days.

(21) Appl. No.: 11/664,379

(22) PCT Filed: Aug. 3, 2005

(86) PCT No.: PCT/EP2005/053788

§ 371 (c)(1),
(2), (4) Date: Sep. 10, 2007

(87) PCT Pub. No.: WO2006/037677

PCT Pub. Date: Apr. 13, 2006

(65) Prior Publication Data

US 2008/0034170 A1 Feb. 7, 2008

(30) Foreign Application Priority Data

Oct. 1, 2004 (DE) ........................ 10 2004 047 780

(51) Int. Cl.
*G06F 12/00* (2006.01)
(52) U.S. Cl. .................... 711/202; 711/101; 711/110; 711/118; 711/154; 73/489; 73/491; 73/504.03

(58) Field of Classification Search ................ 711/154, 711/101, 110, 118, 202; 73/489, 491, 504.03
See application file for complete search history.

(56) References Cited

U.S. PATENT DOCUMENTS

| | | | | |
|---|---|---|---|---|
| 5,154,246 A | * | 10/1992 | DiGiulio et al. | 177/25.15 |
| 6,274,948 B1 | | 8/2001 | Blank et al. | |
| 6,408,244 B2 | * | 6/2002 | Ito | 701/213 |
| 7,146,237 B2 | * | 12/2006 | Lev-Ami et al. | 700/121 |
| 2003/0046382 A1 | * | 3/2003 | Nick | 709/224 |
| 2004/0088094 A1 | | 5/2004 | Kleinschmidt et al. | |

FOREIGN PATENT DOCUMENTS

| | | |
|---|---|---|
| JP | 3-164855 | 7/1991 |
| JP | 2002-256958 | 9/2002 |
| JP | 2002-259324 | 9/2002 |
| WO | WO 02/080463 | 10/2002 |

* cited by examiner

*Primary Examiner*—Stephen C Elmore
(74) *Attorney, Agent, or Firm*—Kenyon & Kenyon LLP

(57) ABSTRACT

A method is described for reading out sensor data from an intermediate memory written by at least one sensor to the intermediate memory at a data-transfer rate ($T_{pas}$). A sampling rate ($T_{sg}$) is selected in such a way as to avoid an overflow of the intermediate memory and all buffered sensor data is read into a control unit memory at the predetermined sampling rate ($T_{sg}$), the intermediate memory generating a message (RBE) if no new sensor data is present in the intermediate memory at the time of sampling.

8 Claims, 3 Drawing Sheets

METHOD FOR READING OUT SENSOR DATA

FIELD OF THE INVENTION

The present invention is directed to a method for reading out sensor data independent claim.

BACKGROUND INFORMATION

In occupant protection systems, for example airbag systems, sensors in a central control unit and distributed peripheral sensors are used. The peripheral sensors derive their working cycle from an oscillator circuit, which has a specific tolerance. As a result, the sampling rate of the sensor data also has tolerances. The tolerances are, for example, caused by variations in different components and by temperature effects; however, they are briefly very stable in individual sensors. In the control unit, the sensor data is normally buffered in a receiver ASIC and is read out from an evaluation and control unit designed as a microprocessor using a fixed time reference (e.g., 250 μs).

In this connection, two basic cases can be distinguished. In a first case, the transfer rate of the sensor data is selected in such a way that the sensor delivers sensor data to the receiver ASIC at an increasingly faster rate than the microprocessor in the control unit can read out new sensor data from the receiver ASIC. Thus, transfer rate Tpas of the sensor data from the sensor to the receiver ASIC is, for example, 228 μs (Tpas=228 μs) while readout rate Tsg of the microprocessor in the control unit is, for example, 250 μs (Tsg=250 μs), i.e., Tpas<Tsg. This ensures that "new" sensor data is constantly being read in by the control unit. Sensor data can be lost if new sensor data from the sensor is transferred into the receiver ASIC before the control unit has read out the "old" sensor data from the receiver ASIC, i.e., the new sensor data "overwrites" the sensor data in the receiver ASIC that has still not been read out.

In a second case, transfer rate Tpas of the sensor data is selected in such a way that the sensor delivers sensor data at an increasingly slower rate than the sensor data can be read into the control unit. Transfer rate Tpas is, for example, 512 μs (Tpas=512 μs) and readout rate Tsg is, for example, 500 μs (Tsg=500 μs), i.e., Tpas>Tsg. This ensures that a "jitter effect," i.e., an imprecision of the readout point in time in the process immediately before or after the presence of a new data value in the receiver ASIC, is only present for a maximum of one transmission clock cycle, in contrast to a continuous jitter situation when time base Tsg in the control unit for the readout and time base Tpas in the sensor would be identical, but asynchronous. In the second case, however, a doubling of sensor data is possible if no new sensor data has been transferred before the control unit again reads out "new" sensor data from the receiver ASIC.

As a result, information from the sensor data is either lost or the information is doubled in the conventional methods. In a conventional method for triggering occupant protection means, this can result in losses in performance. This applies in particular if the lost or doubled sensor data represents extreme values in the signal curve, e.g., positive or negative peaks in high-frequency signal components.

SUMMARY OF THE INVENTION

In contrast, the method according to the present invention for reading out sensor data has the advantage that sensor data that is transferred asynchronously from at least one sensor to an intermediate memory in a control unit is read out from the intermediate memory in such a way that an existing equidistance of the sensor signals is preserved and no signal information of the sensor data is lost or doubled. These errors occur in particular when individual sensor data values having in particular high or low amplitude compared to preceding or subsequent data values are lost or read out twice. Because the readout method according to the present invention nearly excludes errors or deviations based on missing or doubled sensor data, it is possible to improve the performance of the triggering method of the occupant protection means in an advantageous manner. The sampling rate for reading out the sensor data from the intermediate memory is selected in an advantageous way such that an overflow of the intermediate memory is avoided and all buffered sensor data is read into a control unit memory at the predetermined sampling rate. If at the point in time of sampling, no new sensor data is present in the intermediate memory, the intermediate memory generates a message notifying the control unit that no new sensor data is present and the control unit waits for the next sampling pulse to read out the sensor data.

It is advantageous in particular that the method according to the present invention makes it additionally possible to obtain information concerning a transfer data-transfer rate and a phase position of the sensor data read out from the at least one asynchronously operating sensor. Thus, for example, it is possible to calculate the data-transfer rate of the sensor from the number of sensor data values read out in a predetermined period of time, the predetermined sampling rate, and the number of messages received in this period of time.

It is then advantageously possible to determine information concerning the phase position of the sensor signals of the at least one sensor from the calculated data-transfer rate, the predetermined sampling rate, and the pattern of the messages.

Furthermore, it is an advantage that the data of the at least one sensor may be stored and/or processed so as to be synchronized with the time base of the control unit if the sampling rate and the determined phase position of the sensor signals are known. It is thus possible to determine the working frequency and accordingly the sampling and transfer rate as well as the phase position of the sensor data of the at least one asynchronous sensor from the timing pattern of the incoming sensor data. This makes it possible to synchronize the signals of the asynchronous sensors to the internal timing pattern in the control unit. The chronological equidistance of the sensor signals is preserved. This improves the quality of the sensor signals and accordingly also the performance of the evaluation method as a part of the triggering method for the occupant protection means. The sensor signals may be mapped to the time base in the control unit via software. This may result in saving additional costs due to additionally necessary control mechanisms such as, e.g., voltage pulses, in the control unit and in the sensor or high precision requirements, for example, through the use of a quartz oscillator instead of a simple RC oscillator.

The at least one sensor may be designed, for example, as part of an upfront sensor system and/or an environmental sensor system and/or a side-impact sensor system and/or a contact sensor system for pedestrian safety.

BRIEF DESCRIPTION OF THE DRAWINGS

Exemplary embodiments of the present invention are depicted in the drawing and explained in greater detail in the following description.

DETAILED DESCRIPTION

Figure 2A:
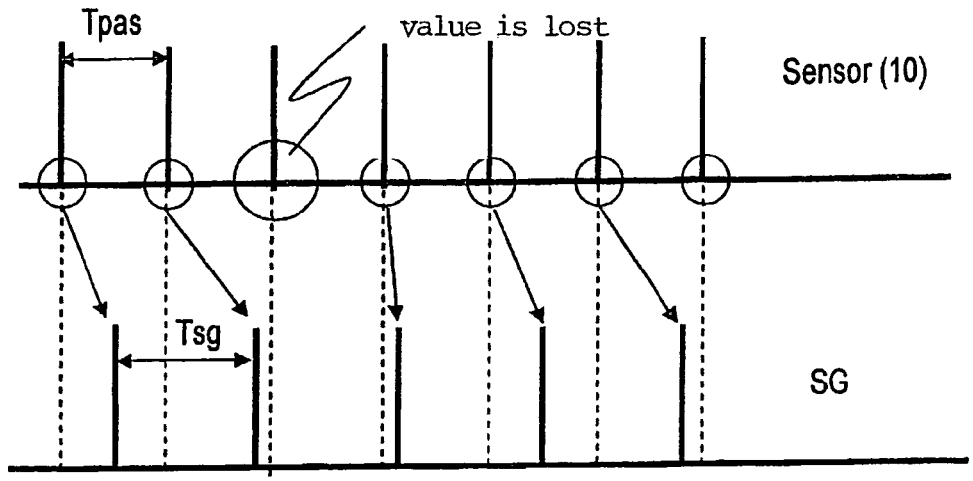
FIGS. 2a and 2b each show a time sequence diagram for representing the signals in a conventional readout method.
Figure 2B:
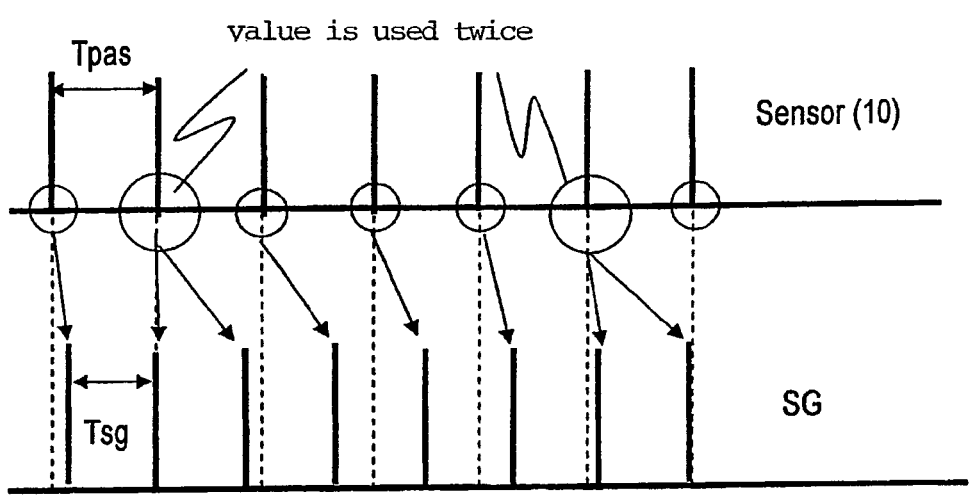

According to the current related art, distributed peripheral sensors are connected to a control unit SG via a supply lead. As FIGS. 2a and 2b show, in a conventional readout method, distributed sensor 10 transmits data at fixed time intervals Tpas of, for example, 228 μs. The time intervals may vary, for example, by +/−5%. The data is buffered in a receiver ASIC, it being possible to buffer one or a plurality of sensor data values. Control unit SG includes a microprocessor which cyclically reads out the data from the receiver ASIC. Reading out the sensor data empties the receive memory in the receiver ASIC.

FIG. 2a shows the case in which a readout rate Tsg is somewhat slower than transmission rate Tpas of the distributed sensors, e.g., Tsg=250 μs, i.e., Tpas<Tsg. As a result, "fresh" values are always being read out. If the receive memory is already full and a new data value arrives, the particular oldest value is discarded. This may result in the loss of individual sensor data values of the sensors.

FIG. 2b shows the case in which readout rate Tsg is somewhat faster than transmission rate Tpas of the distributed sensors, e.g., Tsg=210 μs, i.e., Tpas>Tsg. If the receive memory has still not received a new data value from the sensor in the next readout by control unit SG, the "old" data value already read out before is read out once more, resulting in the doubling of individual data values of the sensors.

According to the present invention, sampling rate Tsg is selected in such a way as to avoid an overflow of the intermediate memory and all buffered sensor data is read into a control unit memory at predetermined sampling rate Tsg, the intermediate memory generating a message (RBE) if no new sensor data is present in the intermediate memory at the time of querying.

Figure 1:
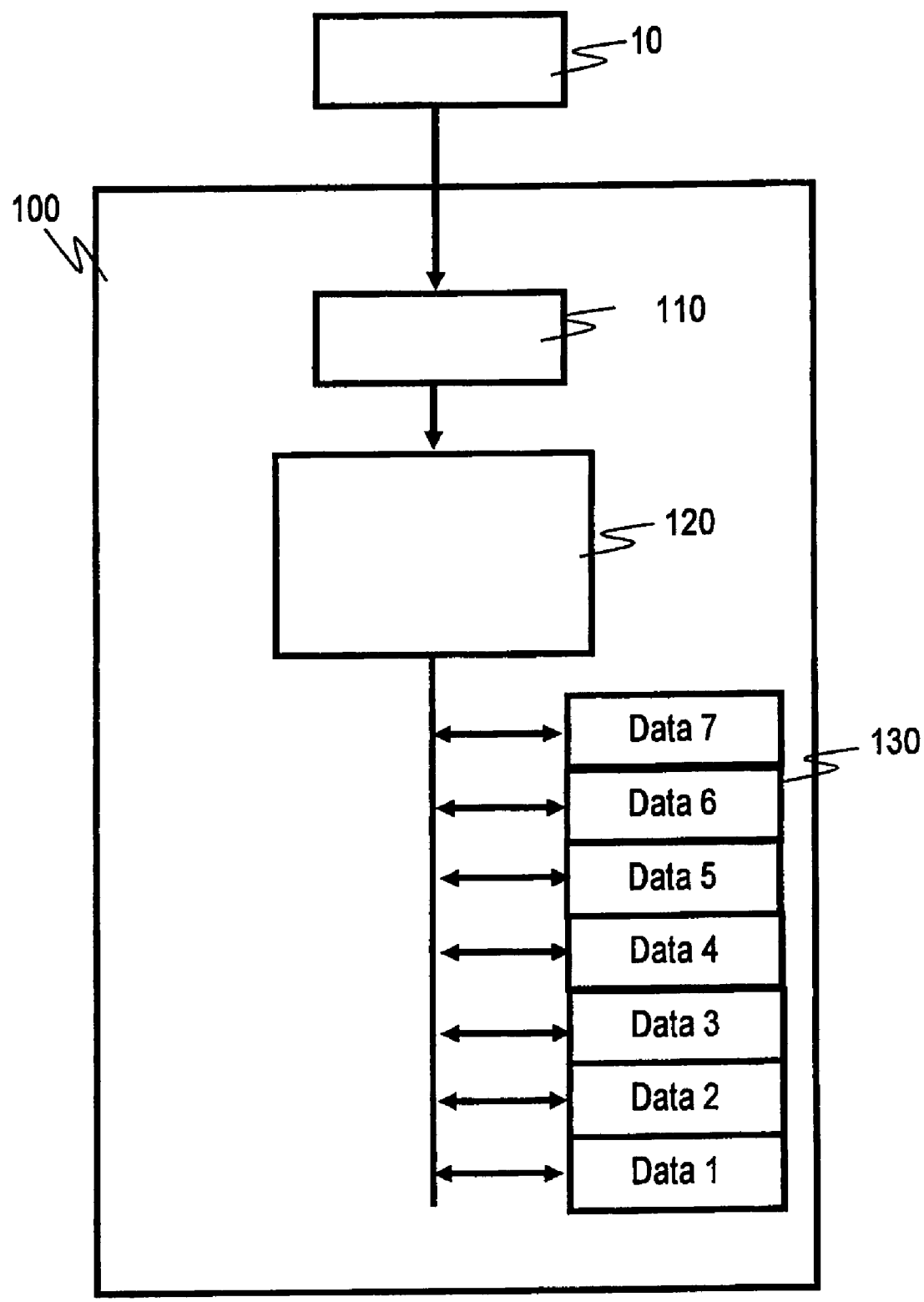
FIG. 1 shows a block diagram of a device for implementing the method according to the present invention.
Figure 3:
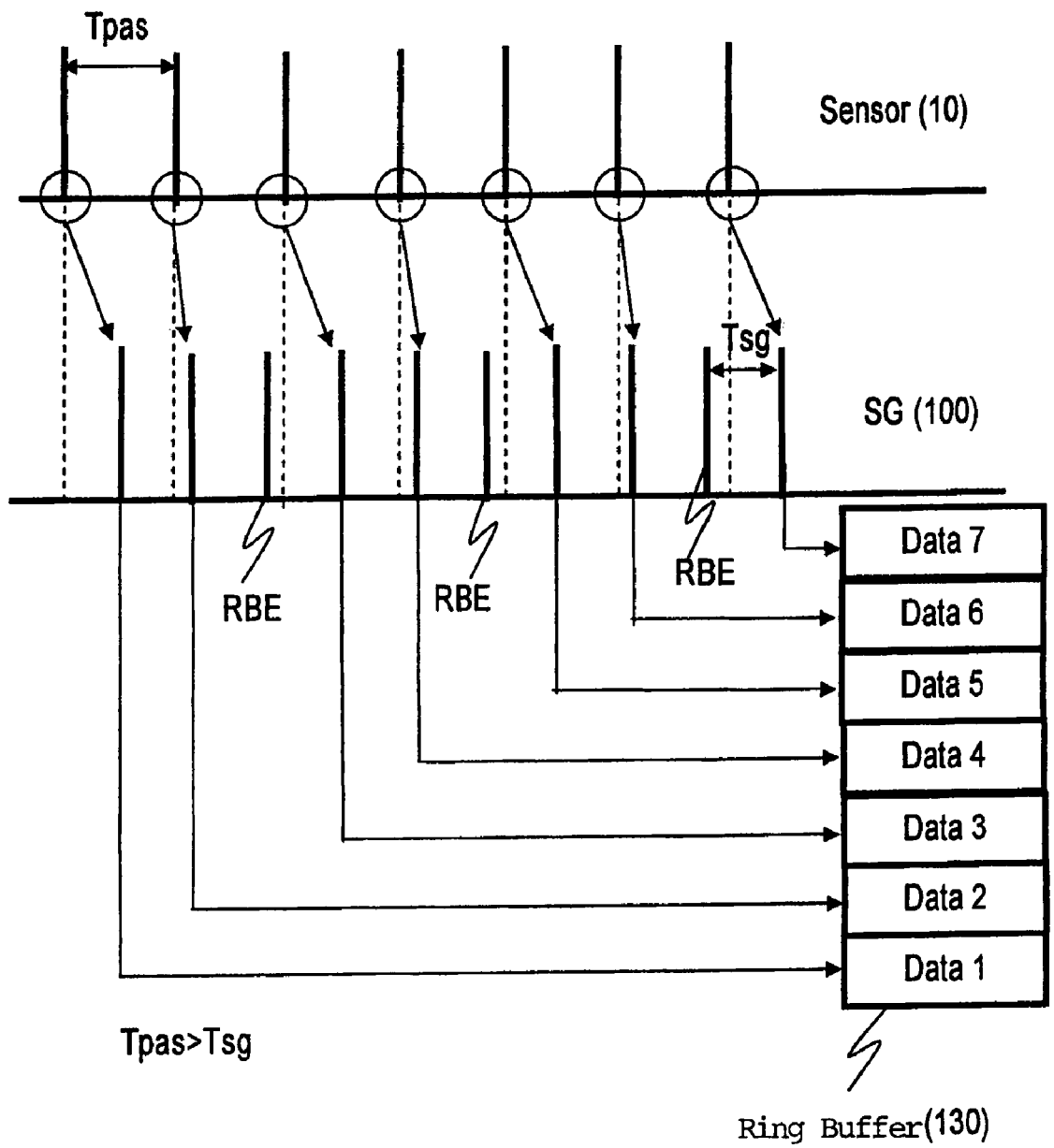
FIG. 3 shows a time sequence diagram for representing the signals in a readout method according to the present invention.

FIG. 1 shows a block diagram of a device for implementing the method according to the present invention for reading out sensor data from an intermediate memory and FIG. 3 shows a time sequence diagram for representing the signals in a readout method according to the present invention. The method according to the present invention is described below with reference to FIG. 1 and FIG. 3.

As shown in FIG. 1, the device includes a distributed sensor system 10, which includes at least one sensor and is connected to a control unit 100 via a supply lead. In a sensor system 10 transmits data at fixed time intervals Tpas of, for example, 228 μs. The time intervals may vary, for example, by +/−5%. The data is buffered in an intermediate memory 110, which is designed, for example, as a receiver ASIC and in which it is possible to buffer one or a plurality of sensor data values. Control unit 100 includes an evaluation and control unit 120, which is designed, for example, as a microprocessor that cyclically reads out the data from intermediate memory 110 at a sampling rate Tsg of, e.g., 200 μs. Reading out the sensor data empties intermediate memory 110. At transfer rate Tpas of 228 μs, readout cycle Tsp=200 μs is selected in such a way as to avoid an overflow of intermediate memory 110 and it is possible to read all data values from evaluation and control unit 120 into control unit memory 130. If no new data value is present at a point in time of sampling, intermediate memory 110 generates a message RBE (Receive Buffer Empty) and transmits this message back to evaluation and control unit 120. Evaluation and control unit 120 then waits for the next sampling pulse to read out the new sensor data. FIG. 3 shows, for example, that intermediate memory 110 in control unit 100 generates message RBE at every third, sixth and ninth sampling pulse shown. This ensures that no doubled data values are read out of intermediate memory 110. The data values from evaluation and control unit 120 are stored in control unit memory 130, which is designed, for example, as a ring buffer, of which, for example, seven memory locations Data 1 through Data 7 are shown, the first data value from the sensor system in the first sampling pulse being stored in first memory location Data 1, the second data value in the second sampling pulse being stored in second memory location Data 2, the third data value in the fourth sampling pulse being stored in third memory location Data 3, etc. All chronologically equidistant values of sensor system 10 are thus available for further processing, for example for a further evaluation by a method for triggering the occupant protection means and may be included in the triggering decision for the occupant protection means such as airbag, seat-belt tightener, etc.

If sampling frequency fsg=1/Tsg of the control unit is known, it is possible to determine working frequency fpas=1/Tpas of sensor system 10. Using value n, which corresponds to the ratio of the number of all data values read out to the number of messages RBE generated in this period of time, converting equation (1) into equation (2) produces:

$$n = Tpas/(Tpas - Tsg) \quad (1)$$

$$Tpas = -(n*Tsg)/(1-n) \quad (2)$$

For example, at a sampling rate of 200 μs and with 500 values read out, from which 62 messages RBE were generated, a value of 8.06 results for n=500/62 and accordingly a data-transfer rate Tpas=−(8.06*200 μs)/(1-8.06)=228 μs.

The phase position may be determined iteratively from the pattern of messages RBE (receive buffer empty) in the reading events. If, for example, the data-transfer rate of the sensor is 228 μs and the sampling rate or the readout rate of control unit 100 is 200 μs, it is possible to determine the age of the most recently read in sensor data value as a maximum of 228 μs−200 μs=28 μs in a cycle in which no new sensor data value is present. The evaluation of the relative position of additional messages RBE may further limit the tolerance. Knowledge of the sampling frequency and the phase position of the sensor data signals makes it possible to store them synchronized to the time base in the control unit, and to process them.

Distributed peripheral sensor system 10 is designed, for example, as part of an upfront sensor system and/or an environmental sensor system and/or a side-impact sensor system and/or a contact sensor system for pedestrian safety.

What is claimed is:

1. A method for reading out sensor data from an intermediate memory written by at least one sensor to the intermediate memory at a data-transfer rate, comprising:
   selecting a sampling rate in such a way that an overflow of the intermediate memory is prevented and all buffered sensor data is read into a control unit memory at the sampling rate; and
   generating by the intermediate memory a message if no new sensor data is present in the intermediate memory at the time of sampling.

2. The method as recited in claim 1, further comprising:
   calculating the data-transfer rate from a number of sensor data values read out in a predetermined period of time, the sampling rate and a number of messages being received in the predetermined period of time.

3. The method as recited in claim 2, further comprising:
determining information relating to a phase position of a sensor signal of the at least one sensor from the calculated data-transfer rate, the sampling rate, and a pattern of the messages.

4. The method as recited in claim 3, further comprising:
at least one of storing and processing the sensor data so as to be synchronized with a time base of a control unit if the sampling rate and the phase position of the sensor signal are known.

5. The method as recited in claim 1, wherein the at least one sensor is part of at least one of an upfront sensor system, an environmental sensor system, a side-impact sensor system, and a contact sensor system for pedestrian safety.

6. The method as recited in claim 1, wherein the intermediate memory includes a receiver ASIC.

7. The method as recited in claim 1, wherein the at least one sensor derives its data-transfer rate from an oscillator circuit.

8. The method as recited in claim 1, wherein the control unit memory includes a ring buffer.

* * * * *